June 16, 1959 J. P. SPALDING ET AL 2,891,147
RECEIVER INCLUDING WAVE GUIDE TEE WITH IMPEDANCE
THEREOF VARIED AT INTERMEDIATE FREQUENCY
Filed Nov. 20, 1957

INVENTORS
JOSEPH P. SPALDING
SYDNEY RATTNER
NICK GEORGE, JR.

2,891,147

RECEIVER INCLUDING WAVE GUIDE T WITH IMPEDANCE THEREOF VARIED AT INTERMEDIATE FREQUENCY

Joseph P. Spalding, Takoma Park, Sydney Rattner, Silver Spring, Md., and Nick George, Jr., Culver City, Calif.; said George assignor to the United States of America as represented by the Secretary of the Army Application November 20, 1957, Serial No. 697,757

5 Claims. (Cl. 250—20)

(Granted under Title 35, U.S. Code (1952), sec. 266)

The invention described herein may be manufactured and used by or for the Government for governmental purposes without the payment to us of any royalty thereon.

This invention relates to a new type of microwave receiving system. This system provides many of the advantages of a superheterodyne-type receiver, but is much simpler, requires fewer parts, and can be made considerably more compact.

In this invention, the microwave signal to be received is amplitude modulated by novel means, is then fed to detection means, and the detected output fed to an I-F amplifier having the modulation frequency as center frequency. The output of the I-F amplifier is connected to conventional associated receiver circuitry. Reception may be accomplished using this system without the need for a microwave local oscillator or complex automatic frequency control circuits as is required in the microwave superhetrodyne receiver. Yet, the system of this invention retains the considerable advantage of the superheterodyne receiver in permitting the use of an I-F amplifier with its inherent characteristics of high gain, fast recovery time, and freedom from microphonics.

An object of this invention is to provide a new type of microwave receiving system.

Another object is to provide a simple microwave receiving system which permits the use of an I-F amplifier.

A further object of this invention is to provide a new type of microwave receiving system having novel amplitude modulation means.

The specific nature of the invention, as well as other objects, uses, and advantages thereof, will clearly appear from the following description and from the accompanying drawing, in which.

Figure 1:
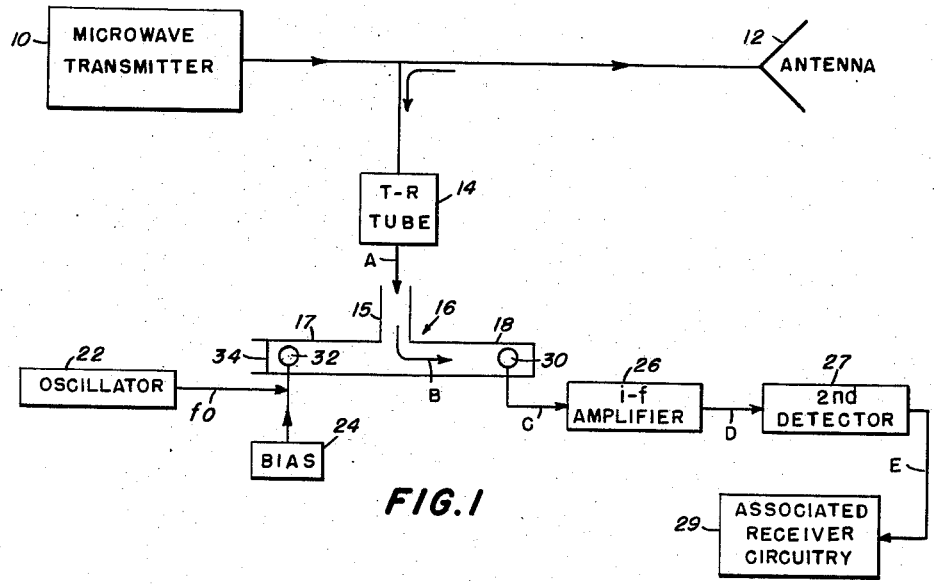
Figure 1 is a schematic representation of a radar system utilizing the microwave receiving system in accordance with the invention.

In Figure 1, a microwave transmitter 10 transmits a microwave signal consisting of microwave pulses by means of the antenna 12. Reflected signals are received by the antenna 12 and are coupled into the input arm 15 of a waveguide T section 16. A T-R tube 14, is located with respect to the transmitter 10, the antenna 12, and the input arm 15 of the waveguide T section 16 for proper operation of the system in accordance with well known practice.

The waveguide T section 16 into which the received microwave signal A is coupled comprises an input arm 15 and first and second output arms 17 and 18 respectively. The first arm 17 is terminated by a crystal 32, which may be of the 1N23B type. An oscillator 22 of frequency $f_0$ is connected to the crystal 32 so as to control the current through the crystal 32. The impedance of the crystal 32, therefore, will vary at the frequency $f_0$ of the oscillator 22. A bias 24 is also connected to the crystal 32 and is used to set the D.-C. level of current through the crystal 32. A bias current which causes the crystal 32 to operate in its positive conducting region is preferable. An adjustable shorting element 34 terminates the first arm 17. The varying impedance termination of output arm 17 causes the microwave signal B which feeds into the second arm 18 of the waveguide T section 16 to be amplitude modulated at the frequency $f_0$. Those skilled in the art will readily be able to choose the position of the adjustable shorting element 34 and the location and impedance range of the crystal 32 to provide any desired amplitude modulation of the microwave signal B up to almost 100% amplitude modulation.

The amplitude modulated microwave signal B is fed to matched crystal detection means 30 terminating the second output arm 18. These detection means 30 detect the amplitude modulation of the microwave signal B. The output C from crystal detection means 30 is fed to an I-F amplifier 26 having the frequency $f_0$ of the oscillator as center frequency. The gain and bandwidth of the I-F amplifier 26 is chosen by well-known means according to the requirements of sensitivity and response desired from the system. The frequency $f_0$ of the oscillator 22 which is the center frequency of the I-F amplifier 26 may be chosen to be a convenient value such as 30 megacycles.

The output D from the I-F amplifier 26 may be fed into a standard type of 2nd detector 27 well-known in the art. The detected pulses E may then be fed into conventional associated receiver circuitry 29 for utilization in the radar system.

Figure 2:
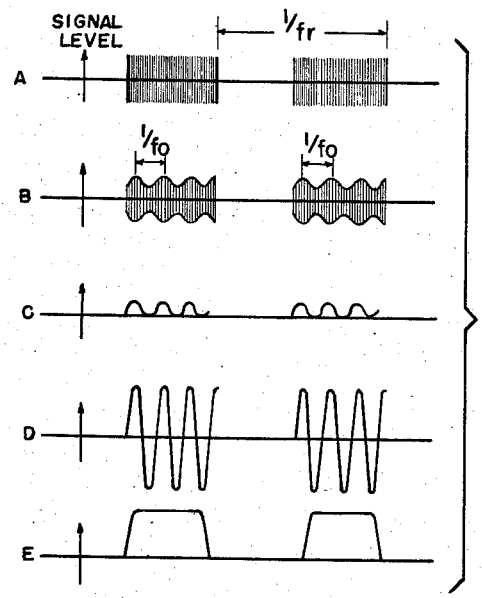
Figure 2 is a series of graphs showing the waveforms at various points in the system of Figure 1.

Figure 2 shows the waveforms at various points in the system of Figure 1. The letters A, B, C, D, and E in Figure 2 correspond to the like letters in Figure 1. The frequency $f_r$ indicated in graph A of Figure 2 represents the repetition rate of the microwave pulses and may be any convenient value, say 2,000 cycles.

As can be seen from Figure 1 no microwave local oscillator or complex automatic frequency control equipment is necessary in this system. The only control necessary is to maintain the center frequency of the I-F amplifier 26 substantially equal to the oscillator frequency $f_0$ which is a relatively easy thing to do. Using this microwave system, therefore, a simple and compact microwave receiver can be constructed which has the considerable advantage of permitting the use of an I-F amplifier with its inherent characteristics of high gain, fast recovery time, and freedom from microphonics.

It will be apparent that the embodiments shown are only exemplary and that various modifications can be made in construction and arrangement within the scope of the invention as defined in the appended claims.

We claim as our invention:

1. Microwave receiving means comprising in combination: means for receiving a microwave signal, a waveguide T section having an input arm and first and second output arms, said signal being coupled into said input arm, means connected to said first arm for varying the impedance at the junction of said T at a predetermined frequency, detection means terminating said second arm, said detection means detecting the amplitude modulation of said microwave signal, an I-F amplifier connected to the output of said detection means, said amplifier having said predetermined frequency as center frequency, and associated receiver circuitry connected to the output of said I-F amplifier.

2. Microwave receiving means, comprising in combination: means for receiving a microwave signal, a waveguide T section having an input arm and first and second output arms, said signal being coupled into said input arm, an impedance terminating said first arm, means for varying said impedance at a predetermined frequency, crystal detection means terminating said second arm, said detection means detecting the amplitude modulation of said microwave signal, and an I-F amplifier connected to the output of said crystal detection means, said amplifier having said predetermined frequency as center frequency, and associated receiver circuitry connected to the output of said I-F amplifier.

3. A radar receiving system, comprising in combination: antenna means for receiving microwave signals, a waveguide T section having an input arm and first and second output arms, the received signal being coupled into said input arm, an impedance terminating said first arm, means for varying said impedance at a predetermined frequency, crystal detection means terminating said second arm, said detection means detecting the amplitude modulation of said microwave signal, an I-F amplifier connected to the output of said crystal detection means, said amplifier having said predetermined frequency as center frequency, and associated circuitry for utilizing the output from said amplifier in said radar system.

4. A radar receiving system, comprising in combination: antenna means for receiving microwave signals, a waveguide T section having an input arm and first and second output arms, the received signal being coupled into said input arm, a crystal terminating said first arm, oscillator means connected to said crystal so as to vary the impedance of said crystal at a predetermined frequency, crystal detection means terminating said second arm, said detection means detecting the amplitude modulation of said microwave signal, an I-F amplifier connected to the output of said crystal detection means, said amplifier having said predetermined frequency as center frequency, and associated circuitry for utilizing the output from said amplifier in said radar system.

5. The invention in accordance with claim 4, there being additionally provided: bias means connected to said crystal for biasing said crystal into the positive conducting region.

References Cited in the file of this patent

UNITED STATES PATENTS

| | | |
|---|---|---|
| 2,682,033 | Smullin | June 22, 1954 |
| 2,770,729 | Dicke | Nov. 13, 1956 |
| 2,832,885 | Brett | Apr. 29, 1958 |